(12) United States Patent
Wang et al.

(10) Patent No.: US 12,202,463 B2
(45) Date of Patent: Jan. 21, 2025

(54) METHOD FOR TORQUE CONTROL OF HYBRID VEHICLE, STORAGE MEDIUM AND ELECTRONIC DEVICE

(71) Applicant: GREAT WALL MOTOR COMPANY LIMITED, Hebei (CN)

(72) Inventors: Xiao Wang, Hebei (CN); Lei Zhang, Hebei (CN); Jie Zhang, Hebei (CN); Hailan Wang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 219 days.

(21) Appl. No.: 18/011,209

(22) PCT Filed: Dec. 21, 2021

(86) PCT No.: PCT/CN2021/140115
§ 371 (c)(1),
(2) Date: Dec. 19, 2022

(87) PCT Pub. No.: WO2022/143305
PCT Pub. Date: Jul. 7, 2022

(65) Prior Publication Data
US 2023/0303055 A1 Sep. 28, 2023

(30) Foreign Application Priority Data
Dec. 28, 2020 (CN) .......................... 202011582147.8

(51) Int. Cl.
*B60W 20/10* (2016.01)
*B60W 10/06* (2006.01)
*B60W 10/08* (2006.01)

(52) U.S. Cl.
CPC ............. *B60W 20/10* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 2510/0661; B60W 2510/083;
(Continued)

(56) References Cited

U.S. PATENT DOCUMENTS

2013/0297125 A1* 11/2013 Syed .................. B60K 6/48
180/65.265

FOREIGN PATENT DOCUMENTS

| CN | 103183024 A | 7/2013 |
| CN | 104118422 A | 10/2014 |

(Continued)

*Primary Examiner* — Michael J Zanelli
(74) *Attorney, Agent, or Firm* — Nath, Goldberg & Meyer; Joshua B. Goldberg (57) ABSTRACT

The present disclosure relates to a method for a torque control of a hybrid vehicle, a storage medium and an electronic device. The method includes: determining a target-total-torque-change-gradient when a limitation requirement for a gradient of torque change of a DCT is received; determining a torque request of an electric motor and an actual-torque-response-change-gradient of an engine; and determining a gradient of torque change of the electric motor according to the target-total-torque-change-gradient and the actual-torque-response-change-gradient of the engine; and filtering the torque request of the electric motor according to the gradient of torque change of the electric motor. The limitation of the gradient of torque change of the DCT is considered, A problem that the actual total torque responses of the electric motor and the engine exceeds the limitation requirement of the gradient of torque change of the DCT is effectively solved, and a drivability of the whole vehicle is improved.

9 Claims, 3 Drawing Sheets

(52) U.S. Cl.
CPC ............... *B60W 2510/0661* (2013.01); *B60W 2510/083* (2013.01); *B60W 2510/1055* (2013.01); *B60W 2710/0666* (2013.01); *B60W 2710/083* (2013.01)

(58) Field of Classification Search
CPC ..... B60W 20/1055; B60W 2710/0666; B60W 2710/083; B60W 2710/0672; B60W 2710/085; Y02T 10/62
See application file for complete search history.

(56) References Cited

FOREIGN PATENT DOCUMENTS

| | | | |
|---|---|---|---|
| CN | 104853952 | A | 8/2015 |
| CN | 106427979 | A | 2/2017 |
| CN | 106740824 | A | 5/2017 |
| CN | 109484390 | A | 3/2019 |
| CN | 109720331 | A | 5/2019 |
| CN | 109955726 | A | 7/2019 |
| CN | 110509912 | A | 11/2019 |
| CN | 111114520 | A | 5/2020 |
| DE | 102018212926 | A1 | 2/2020 |
| JP | 2001315552 | A | 11/2001 |
| JP | 2013067352 | A | 4/2013 |
| JP | 2015150974 | A * | 8/2015 |
| KR | 102237064 | B1 * | 4/2021 |

\* cited by examiner

METHOD FOR TORQUE CONTROL OF HYBRID VEHICLE, STORAGE MEDIUM AND ELECTRONIC DEVICE

CROSS-REFERENCE TO RELATED APPLICATIONS

This application is a 35 U.S.C. § 371 national stage application of PCT application No. PCT/CN2021/140115, filed on Dec. 21, 2021, which claims priority to Chinese patent application No. 202011582147.8 filed on Dec. 28, 2020 and entitled "method and apparatus for torque control of hybrid vehicle, storage medium and electronic device", the entire contents of which are incorporated herein by reference.

FIELD

The present disclosure relates to the technical field of vehicles, and more particularly to a method for torque control of hybrid vehicle, a computer-readable storage medium, and an electronic device.

DESCRIPTION OF RELATED ART

In the related art, a hybrid vehicle having a P2 architecture refers to a conventional vehicle additionally provided with an electric motor and a K0 clutch, where an engine is mounted at the front of the K0 clutch, and the electric motor is mounted at the rear of the K0 clutch, the electric motor mounted at the rear of the K0 clutch is generally abbreviated as a P2 electric motor, and an architecture composed of the engine, the electric motor and the K0 clutch is referred to as the P2 architecture. As for a hybrid vehicle having the P2 architecture, two power sources (i.e., the engine and the electric motor) are existed, the two power sources need to transmit torque externally through a dual clutch transmission (Dual Clutch Transmission, DCT).

When two power sources for providing a hybrid driving are existed, how to limit the gradients of torque changes of the two power sources is a difficult point. Currently, due to the fact that the actual torque response of the engine may be suddenly changed although a torque request of the engine meets a limitation of gradient change of the engine, and a torque request of the electric motor meets a limitation of gradient change of the electric motor, such that the actual torque responses of the electric motor and the engine exceed a limitation of a gradient of torque change of the DCT, and a drivability of the whole vehicle is affected.

SUMMARY

An objective of the present disclosure is to provide a method for torque control of a hybrid vehicle, a storage medium, and an electronic device, thereby solving a technical problem that the actual total torque responses of the electric motor and the engine exceed the limitation requirement of the gradient of torque change of the DCT because that the actual torque response of the engine does not meet the limitation requirement of the gradient of torque change of the engine, and improving the drivability of the whole vehicle.

In order to achieve the aforesaid objective, in the first aspect, a method for torque control of a hybrid vehicle implemented by a vehicle controller is provided in the embodiments of the present disclosure, this method includes:

determining a target-total-torque-change-gradient when a limitation requirement for a gradient of a torque change of a dual clutch transmission (DCT) is received, wherein the target-total-torque-change-gradient is a minimum of the gradient of torque change of the DCT and a total-torque-request-filter-gradient of a front-axle;

determining a torque request of an electric motor and an actual-torque-response-change-gradient of an engine;

determining a gradient of torque change of the electric motor according to the target-total-torque-change-gradient and the actual-torque-response-change-gradient of the engine; and filtering the torque request of the electric motor according to the gradient of torque change of the electric motor.

Optionally, the method further includes:

determining the total-torque-request-filter-gradient of the front-axle as the target-total-torque-change-gradient, when the limitation requirement for the gradient of torque change of the DCT is not received.

Optionally, the limitation requirement for the gradient of torque change of the DCT is sent out by an automatic transmission control unit under a preset operating condition of the hybrid vehicle.

Optionally, said determining the target-total-torque-change-gradient when the limitation requirement for the gradient of torque change of the DCT is received includes:

obtaining the gradient of torque change of the DCT and the total-torque-request-filter-gradient of the front-axle;

determining a difference value between the gradient of torque change of the DCT and the total-torque-request-filter-gradient of the front-axle;

determining the total-torque-request-filter-gradient of the front-axle as the target-total-torque-change-gradient if the difference value is greater than zero; or determining the gradient of torque change of the DCT as the target-total-torque-change-gradient if the difference value is less than or equal to zero.

In the second aspect, a computer device is provided in the embodiments of the present disclosure, the computer device includes:

a memory which stores a computer-readable program code; and at least one processor;

where the at least one processor is configured to, when executing the computer-readable program code, implement a method for torque control of a hybrid vehicle, including: determining a target-total-torque-change-gradient when a limitation requirement for a gradient of a torque change of a dual clutch transmission (DCT) is received, where the target-total-torque-change-gradient is a minimum of the gradient of torque change of the DCT and a total-torque-request-filter-gradient of a front-axle; determining a torque request of an electric motor and an actual-torque-response-change-gradient of an engine; determining a gradient of torque change of the electric motor according to the target-total-torque-change-gradient and the actual-torque-response-change-gradient of the engine; and filtering the torque request of the electric motor according to the gradient of torque change of the electric motor.

In the third aspect, a non-transitory computer-readable storage medium is further provided in the embodiments of the present disclosure, where the non-transitory computer-readable storage medium stores a computer program that, when executed by the computer device, causes the computer device to perform the aforesaid method for torque control of the hybrid vehicle.

According to the aforementioned technical solutions, when the limitation requirement for the gradient of torque change of the DCT is received, the target-total-torque-change-gradient is determined, where the target-total-torque-change-gradient is the minimum of the gradient of torque change of the DCT and the total-torque-request-filter-gradient of the front-axle; and the torque request of the electric motor and the actual-torque-response-change-gradient of the engine are determined. The gradient of torque change of the electric motor is determined according to the target-total-torque-change-gradient and the actual-torque-response-change-gradient of the engine. The torque request of the electric motor is filtered according to the gradient of torque change of the electric motor. Under the consideration of the limitation of the gradient of torque change of the DCT, the gradient of torque change of the electric motor is determined according to the target-total-torque-change-gradient and the actual-torque-response-change-gradient of the engine. Thus, a problem that the actual total torque responses of the electric motor and the engine exceeds the limitation requirement of the gradient of torque change of the DCT because that the actual torque response of the engine does not meet the limitation requirement of the gradient of torque change of the engine is effectively solved, and the drivability of the whole vehicle is improved.

Additional aspects and the advantages of the present disclosure will be described in the following description, some of the additional aspects and the advantages of the present disclosure will become apparent from the following descriptions, or be understood according to the practice of the present disclosure.

BRIEF DESCRIPTION OF THE DRAWINGS

The accompanying drawings are used to provide a further understanding of the present disclosure, and constitute a part of the specification, the accompanying drawings and the following embodiments are used to explain the present disclosure, rather than constituted as limitation to the present disclosure. In the drawings.

DETAILED DESCRIPTION OF EMBODIMENTS

The embodiments will be described in detail with reference to the accompanying drawings. It should be understood that the embodiments described herein are only intended to describe and interpret the present disclosure, rather than limiting the present disclosure.

In the related art, in the hybrid vehicle having the P2 architecture, if the gradient of torque changes of two power sources exceeds the limitation of the gradient of total torque change, the smoothness and drivability of the vehicle may be influenced. If the gradient of torque change of the two power sources is lower than the limitation of the gradient of total torque change, the power performance of the vehicle may be affected. Therefore, how to limit the gradient of torque change in the two power sources is particularly important.

During actual operation of the vehicle, the actual torque response of the engine is not linear, that is, the torque request of the engine cannot be changed according to the gradient of torque change of the engine, so that the gradient of torque change of the actual response of the engine is inconsistent with the corresponding gradient of torque change of the engine. The gradient of torque change of the electric motor is determined according to the gradient of torque change of the engine, and the torque request of the electric motor can be well changed according to the gradient of torque change of the electric motor. Due to this reason, a condition that the sum of the actual torque response of the electric motor and the actual torque response of the engine (the actual torque response of the front axle) exceed a limitation of a gradient of torque change of a dual clutch transmission (Dual Clutch Transmission, DCT) is further caused, the control of the DCT and the drivability of the whole vehicle are affected.

In view of this, a method for controlling a torque of a hybrid vehicle, a non-transitory computer-readable storage medium, and an electronic device are provided in the present disclosure. According to this method, the gradient of torque change of the electric motor is determined according to the actual-torque-response-change-gradient of the engine and the target-total-torque-change-gradient, and the gradient of torque change of the DCT is considered. Thus, it is ensured that the gradient of actual torque change of the front axle can meet the gradient of torque change of the DCT, and the drivability of the whole vehicle and the accuracy of control of the DCT are ensured.

Figure 1:
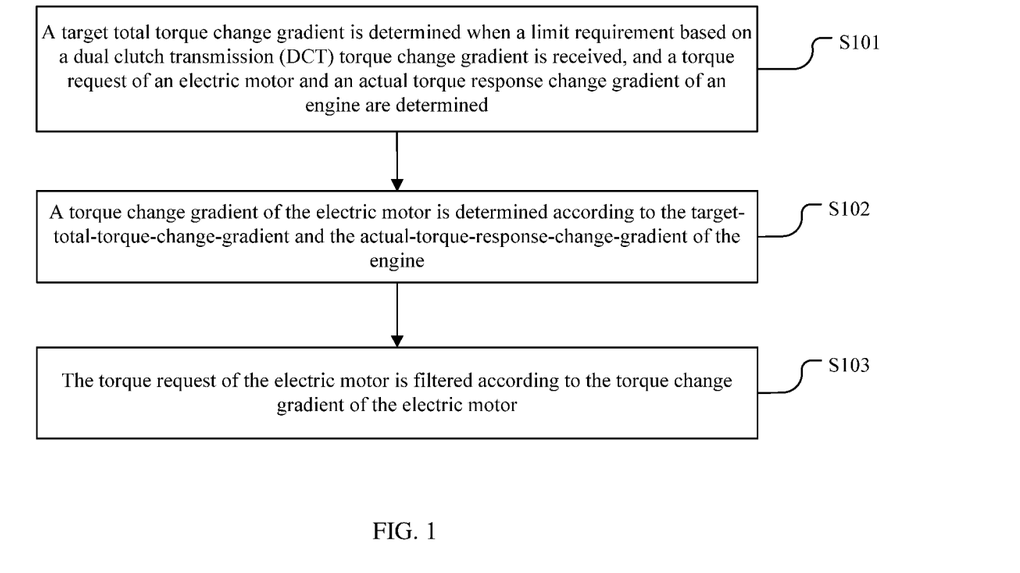
FIG. 1 is one schematic flowchart of a method for controlling a torque of a hybrid vehicle as illustrated in one exemplary embodiment.

FIG. 1 is a flowchart of a method for a torque control of a hybrid vehicle according to one exemplary embodiment. As shown in FIG. 1, the method for the torque control of the hybrid vehicle may be applied to a vehicle controller, and the method for the torque control of the hybrid vehicle includes the following steps:

In a step of S101, a target-total-torque-change-gradient is determined when a limitation requirement for a gradient of torque change of a DCT is received, and a torque request of an electric motor and an actual-torque-response-change-gradient of an engine are determined.

At the step S101, In consideration of the limitation of the gradient of torque change of the DCT, when a limitation requirement for the gradient of torque change of the DCT is received, the vehicle controller determines one of the gradient of torque change of the DCT and the total-torque-request-filter-gradient of the front-axle as the target-total-torque-change-gradient.

Where, the gradient of torque change of the DCT and the total-torque-request-filter-gradient of the front-axle are obtained by analysis according to the actual operating condition of the vehicle. The analysis method may be obtained from the related art, and the detail of the analysis method is not described herein in this embodiment.

It should be noted that the target-total-torque-change-gradient is the minimum of the gradient of torque change of the DCT and the total-torque-request-filter-gradient of the front-axle. For the smoothness and the drivability of the vehicle, the minimum one between the gradient of torque change of the DCT and the total-torque-request-filter-gradient of the front-axle needs to be selected as the targettotal-torque-change-gradient for limiting the torque changes of the engine and the electric motor before and after a time, so that a problem that the vehicle has a poor smoothness and bad drivability because that the vehicle exceeds the minimum gradient change limitation is further avoided.

In one embodiment, the torque request of the electric motor needs to be determined based on the total torque request of the front axle and the torque request of the engine. It can be understood that the total torque request of the front axle is determined by an intention of driving force of a driver. It can be understood that the intention of driving force can be reflected through an accelerator pedal, and a pedaling force of the driver represents the total torque request of the front axle of the driver. The vehicle controller may perform allocation and calculation on the torque requests of the engine and the electric motor according to the total torque request of the front axle. During the allocation process, the vehicle controller needs to fully consider the performance of the engine and allocate an optimal engine torque request to the engine. After the torque request of the engine is determined, the vehicle controller determines the torque request of the electric motor according to the torque request of the engine and the total torque request of the front axle.

It is worth noting that the total torque request of the front axle is equal to the sum of the torque request of the engine and the torque request of the electric motor.

In the present disclosure, since the actual torque response of the engine may be suddenly changed due to a vehicle function such as turbocharging, the actual torque response of the engine is inconsistency with the torque response obtained through the torque request of the engine according to the gradient of torque change of the engine. Therefore, a gradient of engine response is different from the gradient of torque change of the engine. Where the gradient of torque change of the engine is determined by the vehicle controller. Thus, it is necessary to determine the actual-torque-response-change-gradient of the engine to further determine the gradient of torque change of the electric motor.

It may be understood that the actual-torque-response-change-gradient of the engine may be determined according to the actual torque response.

In a step of S102, a gradient of torque change of the electric motor is determined according to the target-total-torque-change-gradient and the actual-torque-response-change-gradient of the engine.

At the step S102, the target-total-torque-change-gradient is the sum of the limitation of the gradient of torque change of the engine and the limitation of the gradient of torque change of the electric motor. Thus, after the actual-torque-response-change-gradient of the engine and the target-total-torque-change-gradient are determined, the difference between the target-total-torque-change-gradient and the actual-torque-response-change-gradient of the engine is used as the gradient of torque change of the electric motor.

In a step of S103, the torque request of the electric motor is filtered according to the gradient of torque change of the electric motor.

According to the aforesaid technical solution, the limitation of the gradient of torque change of the DCT is considered, the vehicle controller selects the minimum one of the gradient of torque change of the DCT and the total-torque-request-filter-gradient of the front-axle so as to meet the limitation requirement of the gradient of torque change of the DCT, and the vehicle controller determines the gradient of torque change of the electric motor according to the target-total-torque-change-gradient and the actual-torque-response-change-gradient of the engine, thereby ensuring that the gradient of the actual torque change of the front axle (i.e., the sum of the gradient of the actual torque change of the engine and the gradient of the actual torque change of the electric motor) meets the limitation requirement of the gradient of torque change of the DCT, and thereby ensuring the driving performance and the drivability of the whole vehicle.

Figure 2:
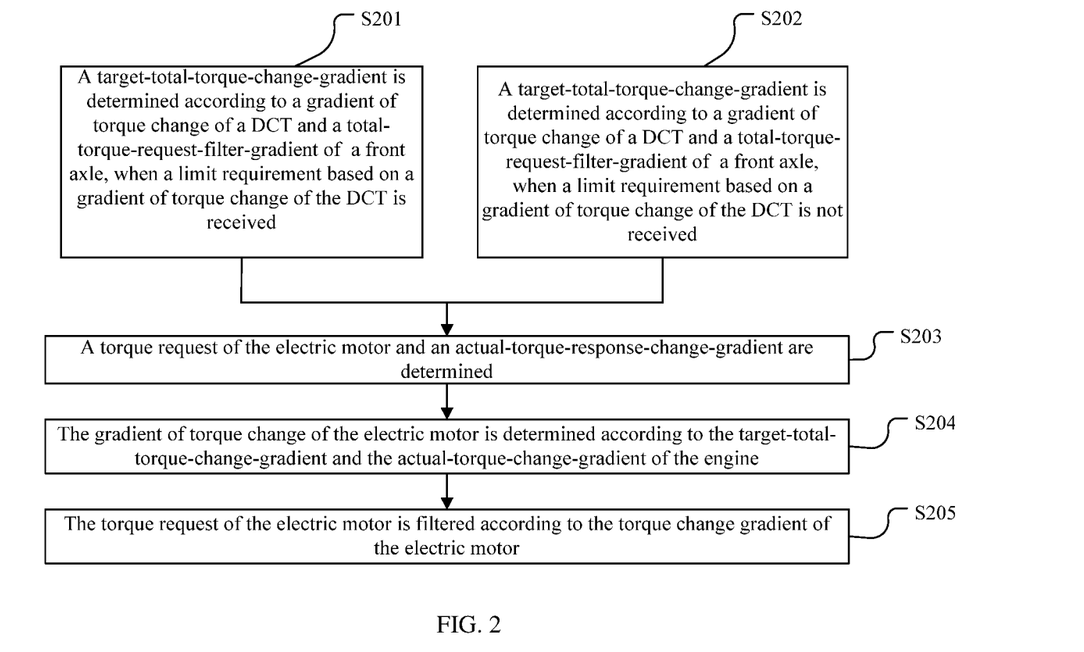
FIG. 2 is another schematic flowchart of the method for torque control of the hybrid vehicle as illustrated in one exemplary embodiment.

FIG. 2 is another flowchart of a method for a torque control of a hybrid vehicle according to one exemplary embodiment. As shown in FIG. 2, this method includes the following steps:

In a step of S201, a target-total-torque-change-gradient is determined from a gradient of torque change of a DCT and a total-torque-request-filter-gradient of a front-axle when a limitation requirement for the gradient of torque change of the DCT is received.

In a step of S202, the total-torque-request-filter-gradient of the front-axle is determined as the target-total-torque-change-gradient when the limitation requirement of the gradient of torque change of the DCT is not received.

In a step of S203, a torque request of an electric motor and an actual-torque-response-change-gradient of an engine are determined.

In a step of S204, the gradient of torque change of the electric motor is determined according to the target-total-torque-change-gradient and the actual-torque-response-change-gradient of the engine.

In a step of S205, the torque request of the electric motor is filtered according to the gradient of torque change of the electric motor.

According to the aforesaid technical solution, when the limitation requirement for the gradient of torque change of the DCT is received, whether the gradient of torque change of the engine and the gradient of torque change of the electric motor need to be determined based on the gradient of torque change of the DCT is considered, so that the limitation of the gradient of torque change of the DCT can be met. When the limitation requirement of the gradient of torque change of the DCT is not received, the gradient of torque change of the engine and the gradient of torque change of the electric motor are determined according to the total-torque-request-filter-gradient of the front-axle, so that the limitation of the total-torque-request-filter-gradient of the front-axle is met.

It should be noted that, the implementation processes of the step S201 and the step S203 are similar to the implementation process of the step S101 shown in FIG. 1. Thus, the details of the step S201 and the step S203 are not repeatedly described in this embodiment.

The implementation process of the step S204 is similar to the implementation process of the step S102 shown in FIG. 1. Thus, the details of the step S204 are not repeatedly described in this embodiment.

The implementation process of the step S205 is similar to the implementation process of the step S104 shown in FIG. 1. Thus, the details of the step S205 are not repeatedly described in this embodiment.

In some embodiments, the limitation requirement of the gradient of torque change of the DCT is sent out by the automatic transmission control unit under a preset operating condition.

It can be understood that, under some specific operating conditions, the change of the torque cannot be too fast, and a gentle transition is required. Therefore, the torque request under this operating condition needs to be limited.

It should be noted that the preset operating condition is determined by the automatic transmission control unit.

In some embodiments, when the limitation requirement for the gradient of torque change of the DCT is received in step S101 as shown in FIG. 1, the determination of the target-total-torque-change-gradient may include:

First, the gradient of torque change of the DCT and the total-torque-request-filter-gradient of the front-axle are obtained.

Then, a difference value between the gradient of torque change of the DCT and the total-torque-request-filter-gradient of the front-axle is determined based on the gradient of torque change of the DCT and the total-torque-request-filter-gradient of the front-axle.

Next, the difference value and zero are compared to determine the target-total-torque-change-gradient. In particular, when the difference value is greater than zero, the total-torque-request-filter-gradient of the front-axle is determined as the target-total-torque-change-gradient; in the condition that the difference value is less than or equal to zero, the gradient of torque change of the DCT is determined as the target-total-torque-change-gradient.

According to the aforesaid technical solution, the target-total-torque-change-gradient is determined in a simple value comparison manner. The gradient of torque change of the DCT and the total-torque-request-filter-gradient of the front-axle are obtained by analysis according to the actual operating condition of the vehicle.

A non-transitory computer-readable storage medium is further provided in the present disclosure, this computer-readable storage medium stores a computer program code, that, when executed by a processor, causes the processor to implement the steps of the method for torque control of the hybrid vehicle in the aforesaid method embodiment.

An electronic device is further provided in the present disclosure, this electronic device includes:
a memory which stores a computer program;
a processor configured to execute the computer program stored in the memory so as to implement the steps in the aforesaid method for torque control of the hybrid vehicle.

Figure 3:
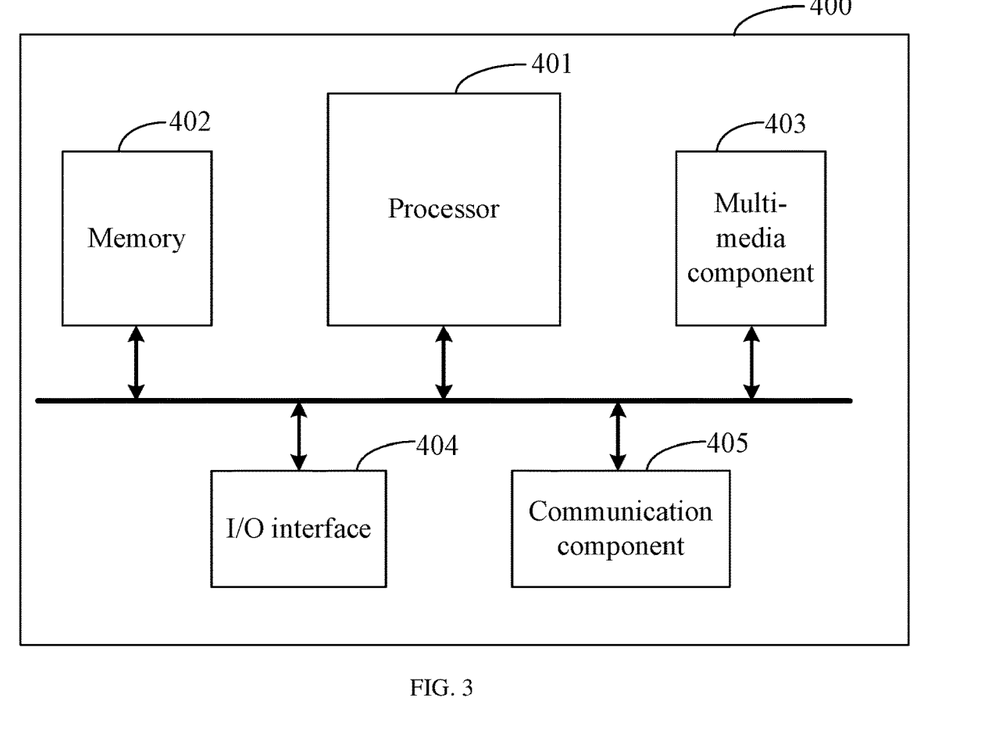
FIG. 3 is a schematic block diagram of an electronic device as illustrated in one exemplary embodiment.

FIG. 3 is a block diagram of an electronic device 400 according to one exemplary embodiment. As shown in FIG. 3, the electronic device 400 may include a processor 401 and a memory 402. The electronic device 400 may further include one or more of a multimedia component 403, an input/output (I/O) interface 404, and a communication component 405.

Where, the processor 401 is configured to control an overall operation of the electronic device 400 so as to complete all or some of the steps of the method for torque control of the hybrid vehicle. The memory 402 is configured to store various types of data so as to support the operation of the electronic device 400. The data may include such as instructions for any application program or method operating on the electronic device 400 and application-related data, such as contact data, transmitted and received messages, pictures, audios, videos, etc. The memory 402 may be implemented by any type of volatile or non-volatile storage device or a combination thereof, such as a static random access memory (Static Random Access Memory, abbreviated as SRAM), an electrically erasable programmable read-only memory (Electrically Erasable Programmable Read-Only Memory, abbreviated as EEPROM), an erasable programmable read-only memory (Erasable Programmable Read-Only Memory, abbreviated as EPROM), a magnetic memory, a flash memory, a magnetic disk, and an optical disc. The multimedia component 403 may include a screen and an audio component. Where the screen may be such as a touch screen, the audio component is configured to output and/or input an audio signal. For example, the audio component may include a microphone for receiving an external audio signal. The received audio signal may be further stored in the memory 402 or transmitted through the communication component 405. The audio component further includes at least one speaker for outputting audio signal. An input/output (Input/Output, I/O) interface 404 provides an interface between the processor 401 and other interface modules, the aforesaid other interface modules may be keyboards, mouse, buttons/keys, or the like. These buttons may be virtual keys or physical buttons. The communication component 405 is configured to perform a wired or wireless communication between the electronic device 400 and other devices. The wireless communication can be such as Wi-Fi, Bluetooth, near field communication (Near Field Communication, NFC), 2G (Second Generation Telecommunication), 3G (Third Generation Telecommunication), 4G (Fourth Generation Telecommunication), narrow band Internet of things (Narrow Band Internet of Things, NB-IoT), eMTC (enhanced Machine-Type Communication), or other 5G (Fifth Generation Telecommunication), etc., or a combination of one or more thereof, the wireless communication is not limited herein. Accordingly, the corresponding communication component 405 may include a Wi-Fi module, a Bluetooth module, a NFC module, and the like.

In an exemplary embodiment, the electronic device 400 may be implemented by one or more of an application specific integrated circuit (Application Specific Integrated Circuit, ASIC), digital signal processor (Digital Signal Processors, DSP), digital signal processing device (Digital Signal Processing Device, DSPD), programmable logic device (Programmable Logic Device, PLD), field programmable gate array (Field Programmable Gate Array, FPGA), controller, micro-controller, microprocessor, or other electronic component. The electronic device 400 is used for performing the method for torque control of the hybrid vehicle.

In another exemplary embodiment, a computer-readable storage medium including the program instruction is further provided, when the program instruction is executed by the processor, the steps in the method for torque control of the hybrid vehicle are implemented. For example, the computer-readable storage medium can be the memory 402 including the program instruction, the program instruction can be executed by the electronic device 400 to implement the method for torque control of the hybrid vehicle.

In order to achieve the aforesaid embodiments, a computer device is further provided in the present disclosure, the computer device includes:
A memory which stores a computer-readable program code; and
one or a plurality of processors. When the computer-readable program code is executed by the one or the plurality of processor(s), the computer device is configured to implement the aforesaid method for torque control of hybrid vehicle.

In order to achieve the aforesaid embodiments, a computer program is further provided in the present disclosure. The computer program includes a computer-readable program code, that, when executed by the computer device, causes the computer device to perform the method for torque control of hybrid vehicle.

A non-transitory computer-readable storage medium is further provided in the present disclosure, where the non-transitory computer-readable storage medium stores the computer program, that, when executed by the computer device, causes the computer device to perform the aforesaid method for torque control of the hybrid vehicle.

Figure 4:
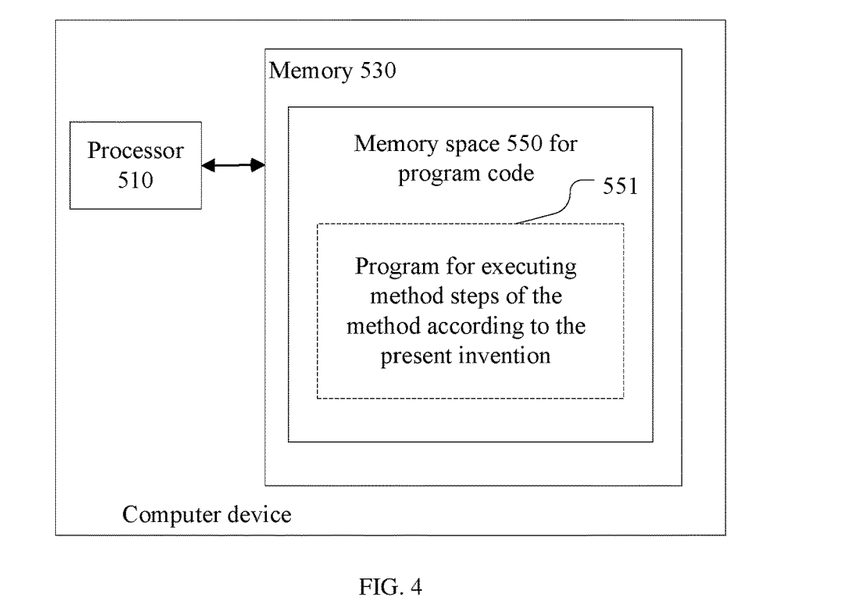
FIG. 4 is a schematic structural block diagram of a computer device device as illustrated in one embodiment of the present disclosure.
Figure 5:
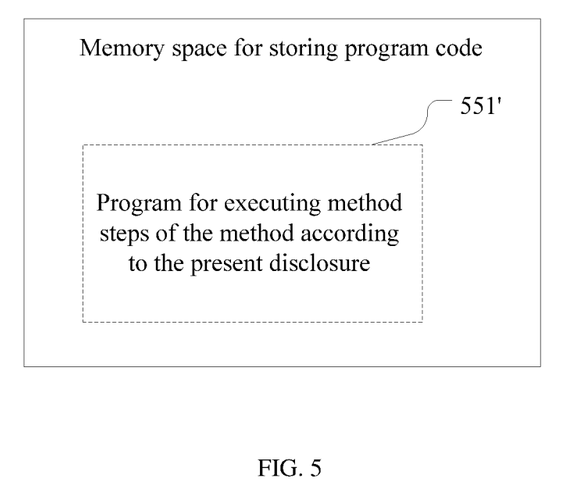
FIG. 5 is a schematic block diagram of a portable or fixedly arranged memory unit according to one exemplary embodiment of the present disclosure.

FIG. 4 illustrates a schematic structural diagram of the computer device according to one embodiment of the present disclosure. The computer device generally includes a processor 510 and a computer program product or computer-readable medium in the form of memory 530. The memory 530 may be an electronic memory such as a flash memory, an electrically erasable programmable read-only memory (Electrically Erasable Programmable Read-Only Memory, EEPROM), an erasable programmable read-only memory (Erasable Programmable Read-Only Memory, EPROM), a hard disk, or a read-only memory (Read-Only Memory, ROM). The memory 530 has a storage space 550 for executing a program code 551 of the method steps in the method for torque control of hybrid vehicle. These program codes may be read out from one or more computer program products or be written into the one or more computer program products. These computer program products include a program code carrier such as a hard disk, a compact disc (Compact Disc, CD), a memory card, or a floppy disk. This computer program product is generally a portable or fixed storage unit as shown in FIG. 5. The storage unit may have a storage segment, or a storage space arranged in a manner similar to that of the memory 530 in a computer device of FIG. 4. The program code may be compressed, for example, the program code may be compressed in an appropriate form. Generally, the storage unit includes a computer-readable code 551' (i.e., a code that can be read by a processor such as the processor 510), that, when executed by a computer device, causes the computer device to perform the various steps in the method for torque control of hybrid vehicle as described above.

In the description of the present application, the descriptions of the reference terms such as "one embodiment", "some embodiments", "example", "specific example" or "some examples" and the like means that the specific technical features, structures, materials or characteristics which are described with reference to the embodiments or the examples are included in at least one embodiment or example of the present application. In the description of the present application, a schematic expressions of the terms mentioned above don't necessarily aim at the same embodiment or example. Furthermore, the specific technical features, structures, materials, or characteristics described above may be combined in any suitable manner in any of one or a plurality of embodiments or examples. In addition, under the condition of without conflicting with each other, different embodiments or examples described in the description and the features in the different embodiments or examples may be integrated and combined by the person of ordinary skill in the art.

In addition, terms "the first" and "the second" are only used for description purposes, and should not be considered as indicating or implying any relative importance, or implicitly indicating the number of indicated technical features. As such, technical feature(s) restricted by "the first" or "the second" can explicitly or implicitly comprise one or more such technical feature(s). In the description of the present application, "a plurality of" has the meaning of at least two, such as two, three, and the like, unless there is additional explicit and specific limitation.

Any process or method described in the flowchart or described in other manner may be interpreted as a module of a code of an executable instruction of steps for realizing a customized logic function, a segment, or portion, and the scope of the preferable embodiments of the present disclosure includes additional implementations, the functions may be performed without following a depicted order or a discussed order including, in a substantially simultaneous manner or in a reverse order according to the involved functions. The aforesaid process or method should be understood by the person of ordinary skill in the art which the embodiments of the present disclosure pertain to.

The logic and/or steps represented in the flowcharts or described in other manner can be, for example, considered as a fixed sequence table of executable instruction for implementing logical functions, may be implemented in any computer-readable medium, and are used by an instruction execution system, an apparatus, or a device (e.g., a computer-based system, a system including a processor, or other systems that may obtain and execute instructions from the instruction execution system), or used in combination with the instruction execution system, the apparatus and the device. As for the specification, a "computer-readable medium" may be any device that can contain, store, communicate, propagate, or transmit a program so as to be used by the instruction execution system, the apparatus and the device or in combination with the instruction execution system, the apparatus and the device. More specific example (a non-exhaustive list) of the computer-readable medium include: an electrical connection part (e.g., electronic device) having one or more wires, a portable computer diskette (magnetic device), a random access memory (Random Access Memory, RAM), a read-only memory (Read-Only Memory, ROM), an erasable programmable read-only memory (Erasable Programmable Read-Only Memory, EPROM) or a flash memory, an optical fiber device, and a portable compact disc read-only memory (Compact Disc Read-Only Memory, CD-ROM). In addition, the computer-readable medium may even be a paper or other suitable medium on which the program can be printed, since the program can be obtained electronically, for example, the program can be obtained by optically scanning paper or other medium, then editing, interpreting, or otherwise processing when necessary, and then storing it in a computer memory.

It should be understood that the various parts of the present disclosure may be implemented by hardware, software, firmware, or a combination thereof. In the aforesaid embodiments, a plurality of steps or methods may be implemented by software or firmware stored in the memory and executed by suitable instruction execution system. For example, if the various parts of the present disclosure are implemented in hardware as is done in other embodiment, the parts of the present disclosure can be implemented with any one or the combination of the following techniques known in the art, which include: a discrete logic circuit having a logic gate circuit for implementing logic functions on data signals, an application specific integrated circuit (Application Specific Integrated Circuit, ASIC) having a suitable combinational logic gate circuit, a programmable gate array (Programmable Gate Array, PGA), a field programmable gate array (Field Programmable Gate Array, FPGA), etc.

A person of ordinary skill in the art may understand that all or some of the steps carried in the method of the embodiments may be implemented by a program instructing relevant hardware. This program may be stored in a computer-readable storage medium. When the program is executed, one or a combination of the steps of the method embodiment is included.

The storage medium mentioned above may be a ROM, a magnetic disc or an optical disk. Although the embodiments of the present application have been illustrated and described above, it should be understood that, the embodiments mentioned above are merely for illustrative, and shouldn't be interpreted as limitation to the present application. The person of ordinary skill in the art may change, modify, replace and transform the embodiments based on the embodiments.

What is claimed is:

1. A method for a torque control of a hybrid vehicle implemented by a vehicle controller, comprising:
    determining a target-total-torque-change-gradient when a limitation requirement for a gradient of a torque change of a dual clutch transmission (DCT) is received, wherein the target-total-torque-change-gradient is a minimum of the gradient of torque change of the DCT and a total-torque-request-filter-gradient of a front-axle;
    determining a torque request of an electric motor and an actual-torque-response-change-gradient of an engine;
    determining a gradient of torque change of the electric motor according to the target-total-torque-change-gradient and the actual-torque-response-change-gradient of the engine; and
    filtering the torque request of the electric motor according to the gradient of torque change of the electric motor.

2. The method according to claim 1, further comprising:
    determining the total-torque-request-filter-gradient of the front-axle as the target-total-torque-change-gradient, when the limitation requirement for the gradient of torque change of the DCT is not received.

3. The method according to claim 1, wherein the limitation requirement for the gradient of torque change of the DCT is sent out by an automatic transmission control unit under a preset operating condition of the hybrid vehicle.

4. The method according to claim 1, wherein said determining the target-total-torque-change-gradient when the limitation requirement for the gradient of torque change of the DCT is received comprises:
    obtaining the gradient of torque change of the DCT and the total-torque-request-filter-gradient of the front-axle;
    determining a difference value between the gradient of torque change of the DCT and the total-torque-request-filter-gradient of the front-axle;
    determining the total-torque-request-filter-gradient of the front-axle as the target-total-torque-change-gradient if the difference value is greater than zero; or
    determining the gradient of torque change of the DCT as the target-total-torque-change-gradient if the difference value is less than or equal to zero.

5. A computer device, comprising:
    a memory which stores a computer-readable program code;
    at least one processor;
    wherein the at least one processor is configured to, when executing the computer-readable program code, implement a method for torque control of a hybrid vehicle, comprising:
    determining a target-total-torque-change-gradient when a limitation requirement for a gradient of a torque change of a dual clutch transmission (DCT) is received, wherein the target-total-torque-change-gradient is a minimum of the gradient of torque change of the DCT and a total-torque-request-filter-gradient of a front-axle;
    determining a torque request of an electric motor and an actual-torque-response-change-gradient of an engine;
    determining a gradient of torque change of the electric motor according to the target-total-torque-change-gradient and the actual-torque-response-change-gradient of the engine; and
    filtering the torque request of the electric motor according to the gradient of torque change of the electric motor.

6. The computer device according to claim 5, wherein the at least one processor is further configured to determine the total-torque-request-filter-gradient of the front-axle as the target-total-torque-change-gradient, when the limitation requirement for the gradient of torque change of the DCT is not received.

7. The computer device according to claim 5, wherein the limitation requirement for the gradient of torque change of the DCT is sent out by an automatic transmission control unit under a preset operating condition of the hybrid vehicle.

8. The computer device according to claim 5, wherein the at least one processor is further configured to implement the step of determining the target-total-torque-change-gradient when the limitation requirement for the gradient of torque change of the DCT is received, by:
    obtaining the gradient of torque change of the DCT and the total-torque-request-filter-gradient of the front-axle;
    determining a difference value between the gradient of torque change of the DCT and the total-torque-request-filter-gradient of the front-axle;
    determining the total-torque-request-filter-gradient of the front-axle as the target-total-torque-change-gradient if the difference value is greater than zero; or
    determining the gradient of torque change of the DCT as the target-total-torque-change-gradient if the difference value is less than or equal to zero.

9. A non-transitory computer-readable storage medium which stores a computer program, that, when executed by a processor of a computer device, causes the processor of the computer device to implement a method for torque control of a hybrid vehicle, comprising:
    determining a target-total-torque-change-gradient when a limitation requirement for a gradient of a torque change of a dual clutch transmission (DCT) is received, wherein the target-total-torque-change-gradient is a minimum of the gradient of torque change of the DCT and a total-torque-request-filter-gradient of a front-axle;
    determining a torque request of an electric motor and an actual-torque-response-change-gradient of an engine;
    determining a gradient of torque change of the electric motor according to the target-total-torque-change-gradient and the actual-torque-response-change-gradient of the engine; and
    filtering the torque request of the electric motor according to the gradient of torque change of the electric motor.

* * * * *